United States Patent
Garehan (10) Patent No.: US 10,549,917 B2
(45) Date of Patent: Feb. 4, 2020

(54) MULTI-DIRECTIONAL ROLLER ASSEMBLY FOR A CONVEYOR

(71) Applicant: Laitram, L.L.C., Harahan, LA (US)

(72) Inventor: Russell J. Garehan, Baton Rouge, LA (US)

(73) Assignee: Laitram, L.L.C., Harahan, LA (US)

( * ) Notice: Subject to any disclaimer, the term of this patent is extended or adjusted under 35 U.S.C. 154(b) by 528 days.

(21) Appl. No.: 14/748,699

(22) Filed: Jun. 24, 2015

(65) Prior Publication Data

US 2015/0375939 A1    Dec. 31, 2015

Related U.S. Application Data

(60) Provisional application No. 62/016,732, filed on Jun. 25, 2014.

(51) Int. Cl.
| | |
|---|---|
| B65G 47/54 | (2006.01) |
| B65G 39/12 | (2006.01) |
| B65G 39/10 | (2006.01) |
| B65G 13/10 | (2006.01) |

(52) U.S. Cl.
CPC .................................. B65G 13/10 (2013.01)

(58) Field of Classification Search
None
See application file for complete search history.

(56) References Cited

U.S. PATENT DOCUMENTS

| | | | |
|---|---|---|---|
| 4,180,150 A | 12/1979 | Moore | |
| 5,921,374 A | 7/1999 | Takino et al. | |
| 6,516,936 B2 | 2/2003 | Nakamura | |
| 6,889,815 B2 | 5/2005 | Kanamori et al. | |
| 7,040,478 B2 * | 5/2006 | Ehlert | B65G 13/10 198/369.4 |
| 9,499,341 B2 * | 11/2016 | Wilkins | B65G 13/065 |
| 2001/0052447 A1 | 12/2001 | Nakamura | |
| 2003/0085106 A1 | 5/2003 | Corley et al. | |
| 2005/0269189 A1 | 12/2005 | Rau et al. | |
| 2013/0192954 A1 | 8/2013 | Fourney | |
| 2014/0116841 A1 | 5/2014 | Wilkins | |

FOREIGN PATENT DOCUMENTS

| | | |
|---|---|---|
| DE | 19610157 A1 | 9/1996 |
| JP | S6256202 A | 3/1987 |
| JP | H06298321 A | 10/1994 |
| JP | 2006298619 A | 11/2006 |
| JP | 2011246265 A | 12/2011 |

OTHER PUBLICATIONS

International Search Report and Written Opinion of the International Searching Authority, PCT/US2015/037380, dated Sep. 24, 2015, Korean Intellectual Property Office, Republic of Korea.
Supplementary European Search Report of Application No. EP15812345.5, dated Jan. 17, 2018, European Patent Office, Munich, Germany.

* cited by examiner

Primary Examiner — Kavel Singh
(74) Attorney, Agent, or Firm — Catherine M. Bishop (57) ABSTRACT

A conveyor and method for moving articles employs a multi-directional roller assembly including an orienting component for orienting a roller and an actuating component for actuating the roller.

17 Claims, 10 Drawing Sheets

FIG. 10

MULTI-DIRECTIONAL ROLLER ASSEMBLY FOR A CONVEYOR

RELATED APPLICATIONS

The present application claims priority to US Provisional Patent Application No. 62/016,732 entitled "Multi-Directional Roller Assembly for a Conveyor" filed Jun. 25 2014, the contents of which are herein incorporated by reference.

BACKGROUND

The invention relates generally to power-driven conveyors and more particularly to conveyors having rollers for manipulating the trajectory of articles through a conveyor system.

Many package- and material-handling applications require that conveyed articles be diverted to a side of a conveyor. Two examples are sorting articles off the side of a belt and registering articles against the side of the belt. U.S. Pat. No. 6,494,312, "Modular Roller-Top Conveyor Belt with Obliquely-Arranged Rollers," Dec. 17, 2002, to Costanzo discloses a conveyor system in which cylindrical rollers mounted in a conveyor belt on axles oblique to the direction of belt travel are actuated by underlying bearing surfaces on which the oblique rollers ride as the belt advances in the direction of belt travel. The contact between the rollers and the bearing surfaces causes the rollers to rotate as the belt advances. The rotation of the oblique rollers pushes articles atop the rollers across the conveyor belt toward a side of the conveyor. These oblique-roller belts work extremely well on planar bearing surfaces as long as the rollers are arranged to rotate at an angle between the direction of belt travel (defined as a roller angle of 0°) and about 30° or so from the direction of belt travel. For roller angles greater than 30°, the rollers slip too much on the planar bearing surfaces.

U.S. Pat. No. 6,968,941, "Apparatus and Methods for Conveying Objects," Nov. 29, 2005, to Fourney describes an improved bearing surface that accommodates a much greater range of roller angles. Instead of using a planar bearing surface, Fourney uses the outer peripheries of actuating rollers arranged to rotate on axes in the direction of belt travel. As the conveyor belt advances, the oblique belt rollers roll on the underlying actuating rollers, which are also caused to roll on their axes. Because the bearing surface on the periphery is rolling, slip is reduced and greater roller angles can be accommodated. The greater roller angles permit much sharper article-diversion trajectories than are possible with a planar bearing surface. But actuating rollers are more expensive and slightly more complicated than simple planar bearing surfaces.

U.S. Pat. No. 7,588,137, "Conveyor Belt Having Rollers that Displace Objects," Sep. 15, 2009, to Fourney describes a conveyor belt that includes multiple roller sets used to divert objects from the conveyor belt. The angles along which articles can be diverted from the conveyor are limited.

SUMMARY

A roller assembly for directing a product along a selected trajectory includes a roller, a roller orienter and a roller activator. The roller activator may rotate about the roller orienter to induce rotation of the roller in a selected direction. A roller plate houses an array of roller assemblies, at least some of which are linked through intermeshed teeth.

According to one aspect of the invention, a roller assembly comprises a first gear for mounting and orienting a roller, a roller mounted to the first gear and a second gear coupled to the first gear for activating the roller.

According to another embodiment, a device for activating a roller in a conveyor system comprises a ring with an inner shelf and a central opening, a plurality of peripheral teeth distributed about a peripheral surface of the ring and a plurality of downward facing inner teeth distributed about an inner surface along the central opening of the ring for engaging a gear connected to the roller.

According to another embodiment, a housing for a roller in a conveyor comprises a first component for mounting a roller and a second component for sandwiching the roller between the first component and the second component. The second component is rotatable about the first component to induce rotation of the roller about a central axis.

According to another aspect, a roller plate comprises a first plate having a plurality of openings, a second plate and an array of roller assemblies between the first and second plate. Each roller assembly has a roller protruding through the opening and peripheral teeth that mesh with peripheral teeth on an adjacent roller assembly to induce rotation of the rollers.

BRIEF DESCRIPTION OF THE DRAWINGS

These aspects and features of the invention are described in more detail in the following description, appended claims, and accompanying drawings, in which:

DETAILED DESCRIPTION

A conveyor system includes an array of multi-directional roller assemblies. Each multi-directional roller assembly includes a bottom gear for orienting and mounting a roller and a top gear for activating a roller. The invention will be described below relative to certain illustrative embodiments, though the invention is not limited to those illustrative embodiments.

Figure 1:
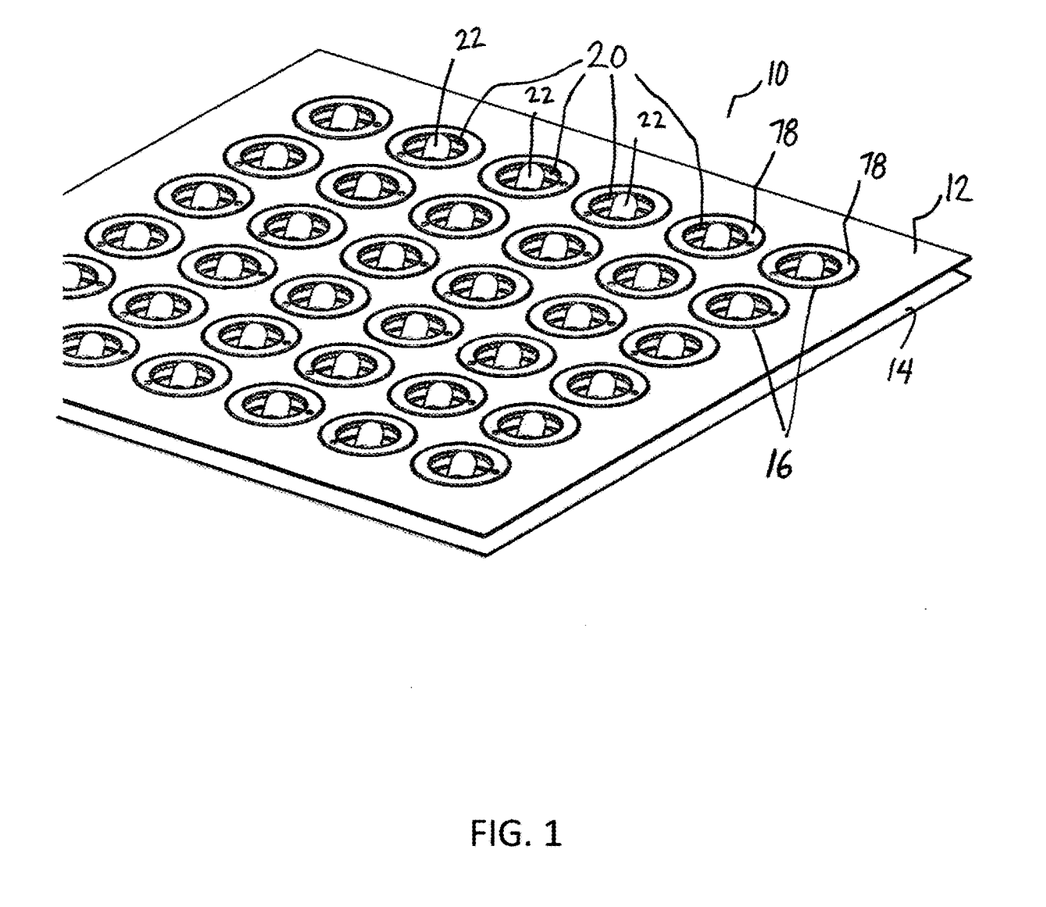
FIG. 1 is an isometric view of a roller plate containing an array of multi-directional rollers according to an embodiment of the invention.

FIG. 1 shows a roller plate containing an array of multi-directional rollers suitable for use in a conveying system according to an embodiment of the invention. The illustrative roller plate 10 comprises a housing, shown as a top plate 12 and a bottom plate 14, for mounting a group of multi-directional roller assemblies 20. Each multi-directional roller assembly 20 includes a roller 22 oriented at a selected angle to direct an article of conveyance along a selected trajectory. The illustrative roller plate has six rows of roller assemblies, each row containing six roller assemblies for a total of thirty-six roller assemblies, though the invention is not limited to the illustrative number and configuration of roller assemblies.

The upper plate 12 includes a plurality of openings 16 for allowing at least a portion of a multi-directional roller assembly 20 to protrude through and above the top surface of the plate 12 to allow contact with articles of conveyance.

Figure 2:
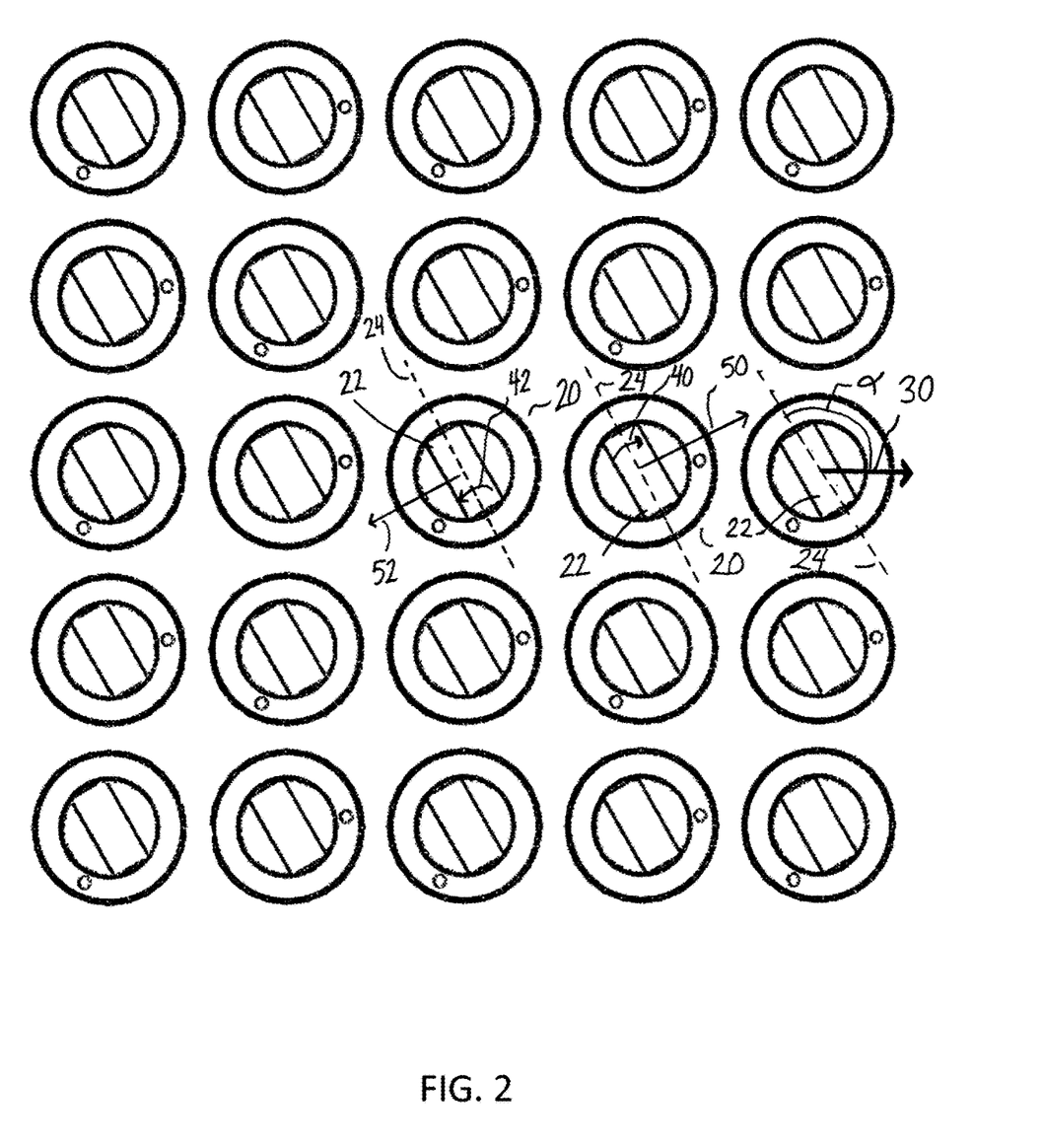
FIG. 2 is a top view of the roller plate in FIG. 1 with the rollers in a first orientation.

For example, as shown in FIG. 2, the multi-directional roller assemblies 20 may be oriented in first orientation to produce a first trajectory for conveyed article. In the embodiment of FIG. 2, the axes 24 of the rollers 22 are oriented at a first select angle α relative to a first direction of conveyance 30, which may be a standard conveying direction. While the embodiment of FIG. 2 shows all of the roller assemblies 20 in the same orientation, the invention is not so limited, and each roller assembly may have a selected orientation. When the rollers 22 rotate about the axes 24 in a first rotation direction 40, an article of conveyance will be pushed in a second conveying direction 50, which is perpendicular to the axes 24. Rotation of the rollers 22 in an opposite rotation direction 42 causes movement of products in contact with the rollers in an opposite, third conveying direction 52.

Figure 3:
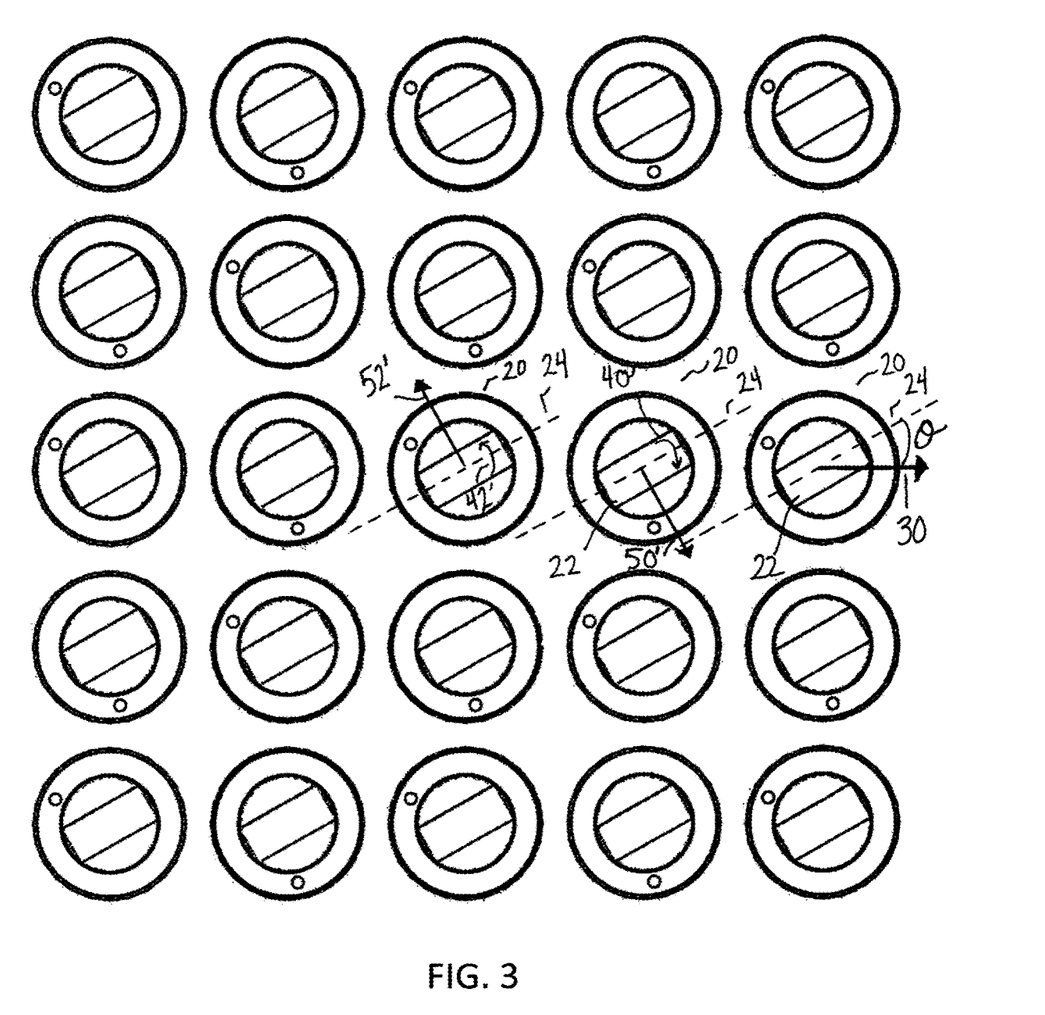
FIG. 3 is a top view of the roller plate in FIG. 1 with the rollers in a second orientation.

In the embodiment of FIG. 3, the multi-directional roller assemblies 20 are oriented at a second angle θ relative to the first direction of conveyance 30. Actuation of the rollers 22 about the axes 24 in a rotation direction 40' pushes an article of conveyance in another conveying direction 50'. Rotation of the rollers in another direction 42' opposite the direction 40' causes movement of products in contact with the rollers in conveying direction 52', which is opposite from direction 50'.

The resulting conveying direction of a conveyed product is based on the orientation of the rollers as well as the direction of rotation of the rollers when activated. The resulting product trajectory will be 90° plus or minus the orientation angle of the rollers 22 relative to the standard conveying direction 30. When rollers axes are perpendicular to the standard conveying direction, resulting product trajectory will be along the standard conveying direction 30, or opposite the standard conveying direction, depending on the direction of rotation of the rollers. The rollers 22 may be oriented at any suitable angle to achieve a desired output trajectory.

Figure 4:
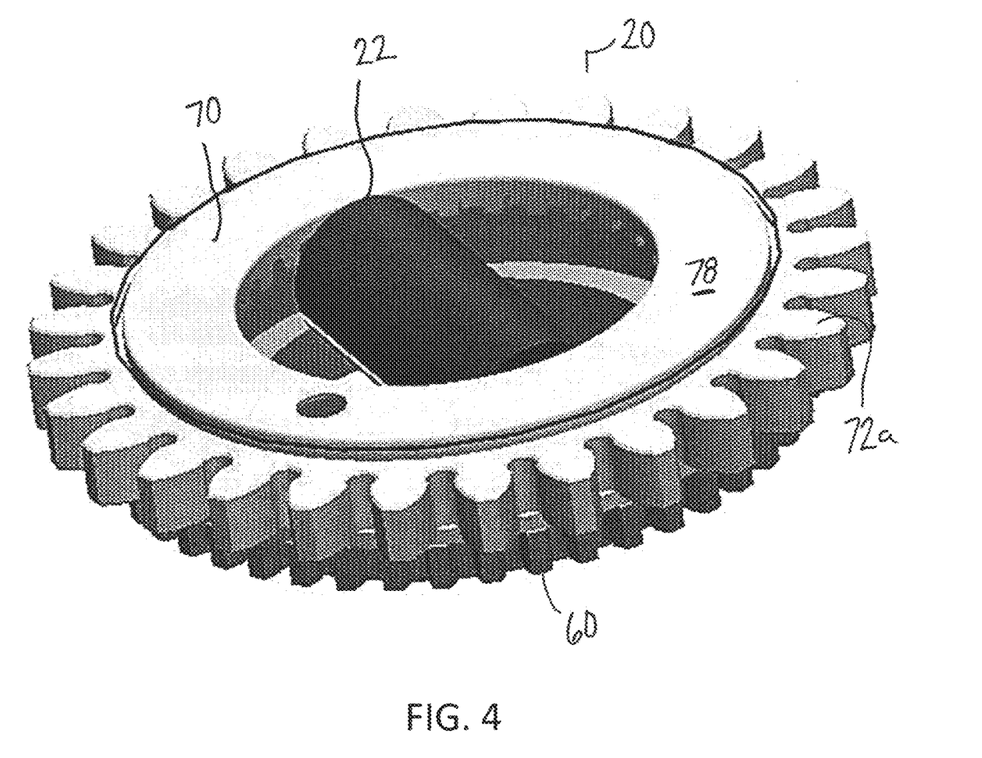
FIG. 4 is an isometric view of a multi-directional roller assembly suitable for use in the roller plate of FIG. 1.
Figure 5:
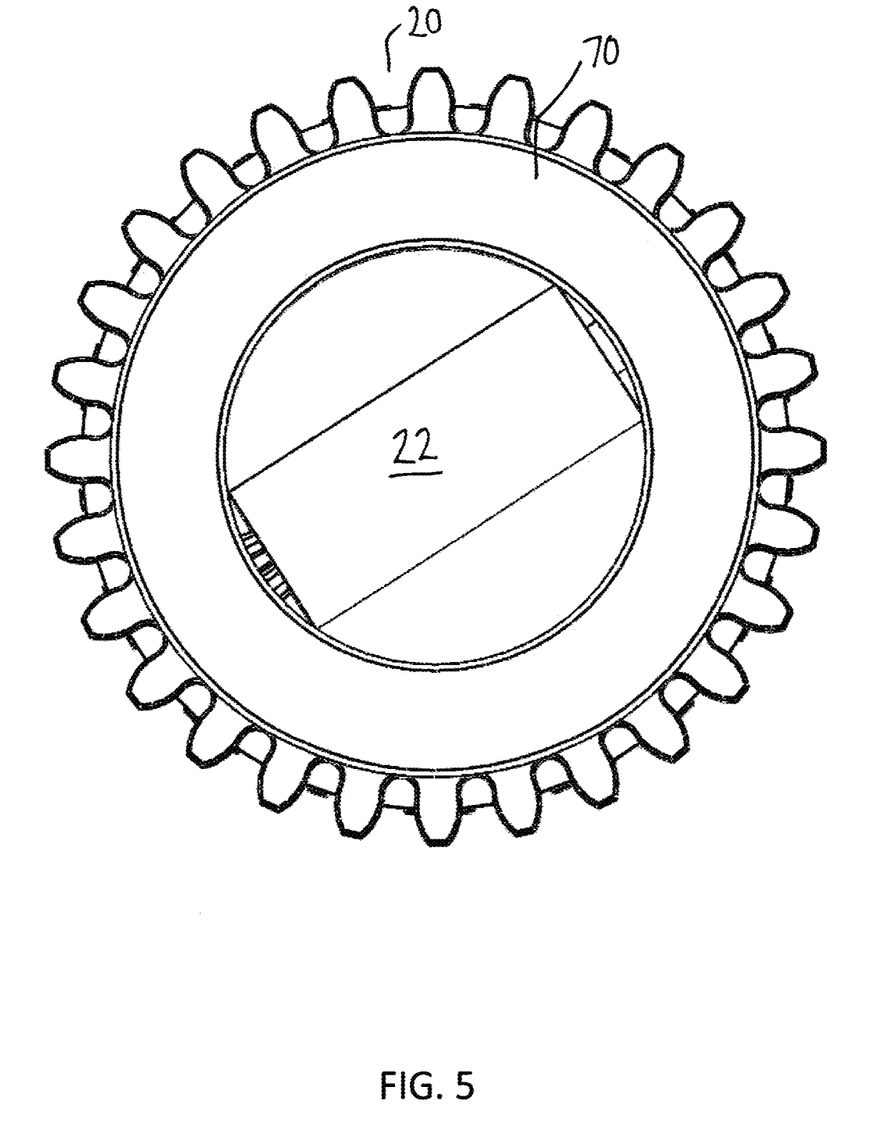
FIG. 5 is a top view of the multi-directional roller assembly of FIG. 4.
Figure 6:
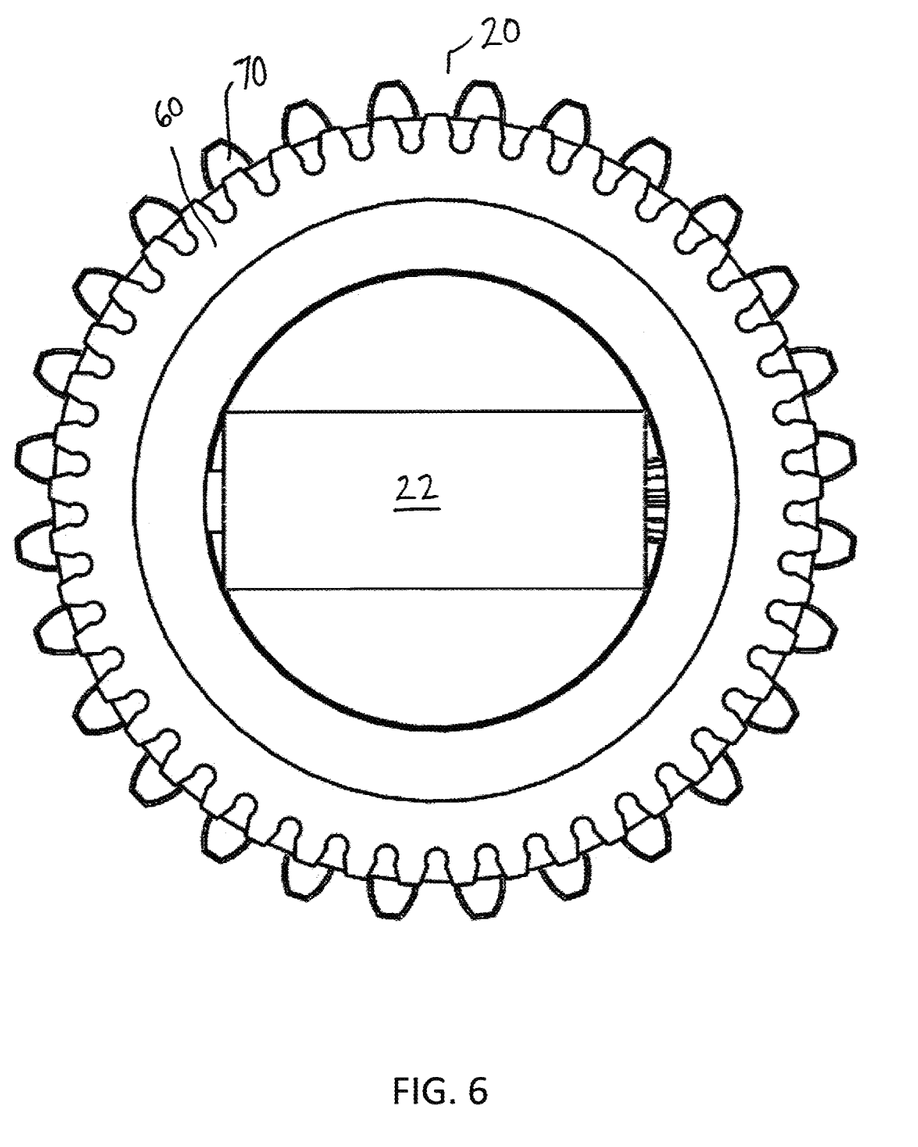
FIG. 6 is a bottom view of the multi-directional roller assembly of FIG. 4.

FIG. 4 is an isometric view of an embodiment of a multi-directional roller assembly 20 suitable for use in a roller plate for a conveying system, such as the roller plate 10 shown in FIGS. 1-3, or for use with another device in a conveying system. FIG. 5 is a top view of the assembly 20, and FIG. 6 is a bottom view of the assembly 20. The illustrative roller assembly 20 includes a roller 22 for directing a conveyed article in a selected direction. A housing for the roller 22 includes a first component for orienting the roller 22 and a second component for actuating the roller 22. The illustrative orienting component is a lower ring gear 60 and the illustrative actuating component is an upper ring gear 70 that forms a cap for the lower ring gear, sandwiching the roller 22 therebetween.

Figure 7:
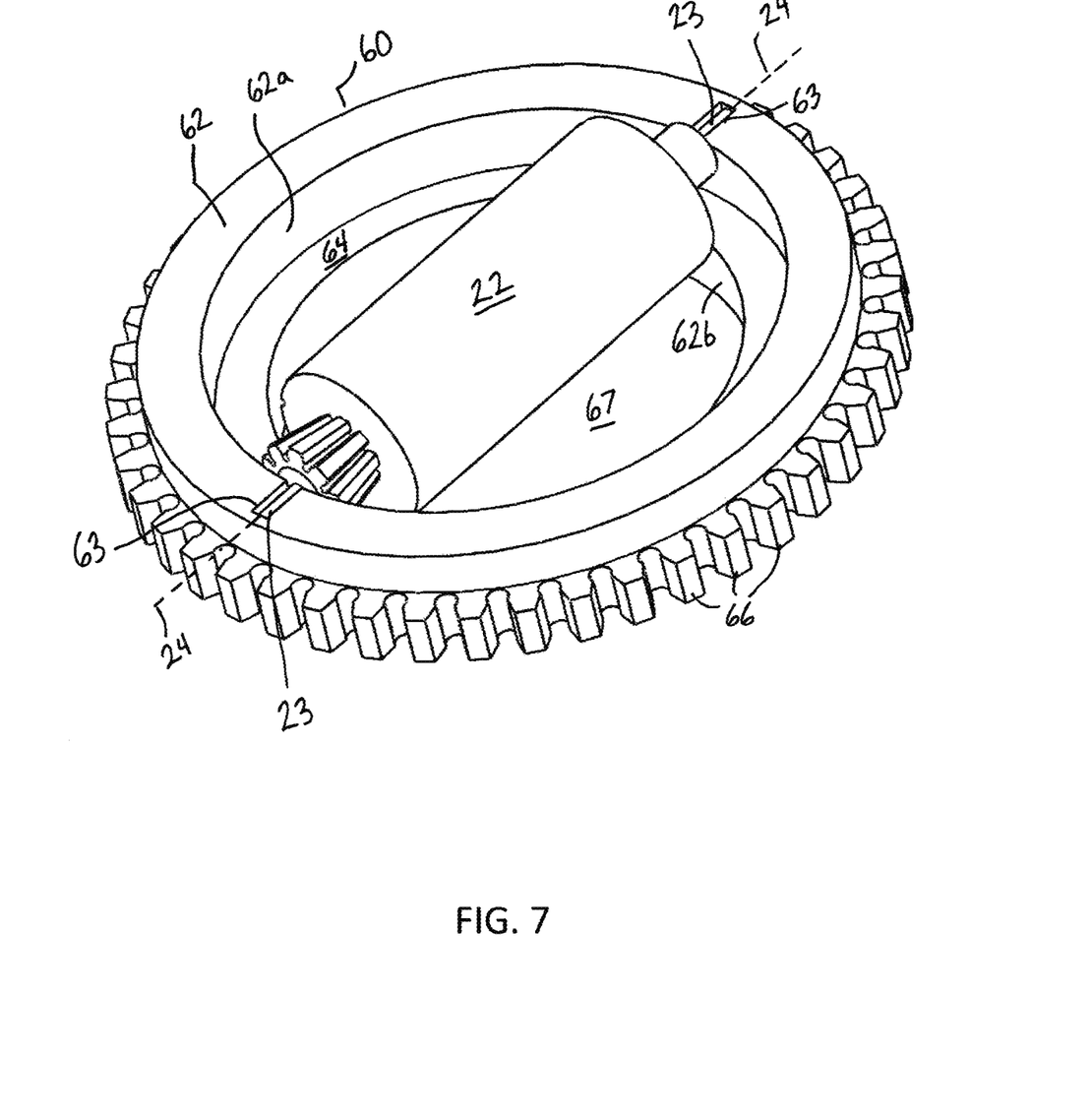
FIG. 7 is an isometric view of a roller mounted in a lower ring gear for orienting the roller assembly.

As shown in FIG. 7, the lower gear 60 is a ring gear comprising a central ring 62 including opposing slots 63 for receiving axle ends 23 of the roller 22. The central ring includes an upper portion 62a and a lower portion 62b that has a smaller central opening 67 than the upper portion 62a to create an inner shelf 64 about the central opening 67. The main roller portion 22 extends below the inner shelf 64, which supports the ends of the roller. The lower portion 62b also includes peripheral teeth 66.

Other means for mounting the roller 22 to the lower gear 60 may be used. For example, the axle ends 23 may be inserted into openings in the side wall of the central ring 62 to rotatably mount the roller to the lower gear 60. In the illustrative embodiment, the roller 22 rotates freely about its longitudinal axis 24 when mounted to the lower gear, though the invention is not so limited.

The roller 22 may or may not protrude through the bottom opening 67.

Figure 8:
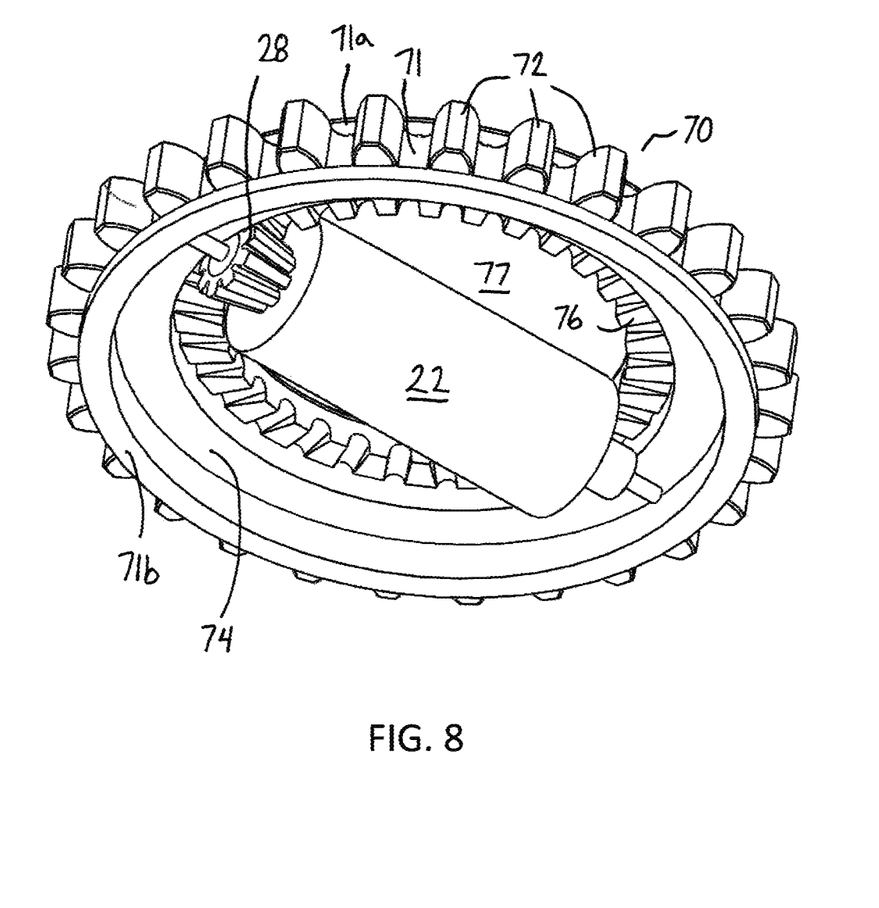
FIG. 8 is a bottom view of a roller coupled to an upper ring gear for actuating the roller.

FIG. 8 is a bottom view of the top gear 70. The top gear includes a central ring 71 including outer peripheral teeth 72. The central ring has an upper portion 71a extending above the teeth 72 and a lower portion 71b extending below the teeth 72. The inside of the central ring is stepped to form a first shelf 74. The top gear further includes an inner ring of teeth 76 distributed about the inner rim of the central ring 71. The inner teeth 76 face downwards and are configured to engage a gear 28 connected to the roller 22. The inner teeth 76 are stepped up from the shelf 74.

Figure 9:
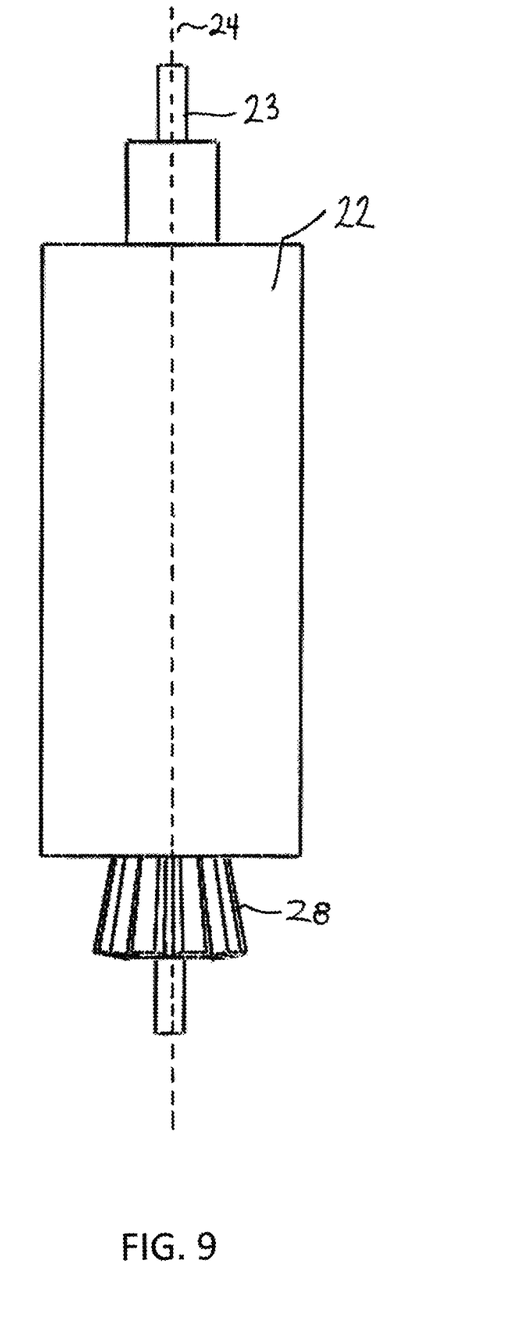
FIG. 9 is a side view of a roller suitable for use in a multi-directional roller assembly.
Figure 10:
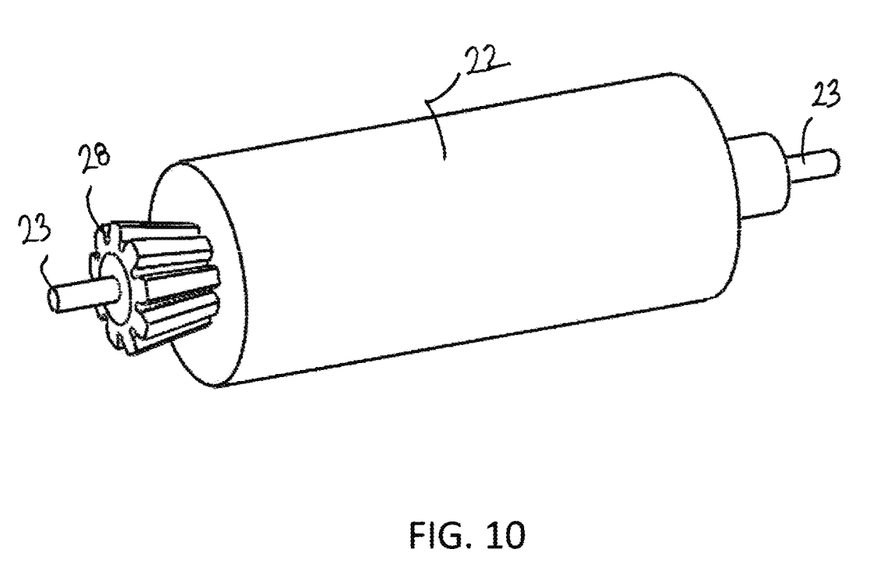
FIG. 10 is an isometric view of the roller of FIG. 9.

FIGS. 9 and 10 show an embodiment of a roller 22 suitable for use with the lower gear 60 and upper gear 70. The roller includes a central cylindrical portion suitable for contacting conveyed articles. Suitable roller materials and sizes are known in the art. The roller further includes a gear 28 at one end of the central cylindrical portion having teeth for engaging the inner teeth 76 of the top gear 70. Axle ends 23 extend along the longitudinal axis 24 of the roller for mounting the roller to the lower gear 60. The illustrative gear 28 is frusto-conical in shape, though the invention is not so limited.

Referring back to FIG. 4, to assemble the roller assembly 20, the roller 22 is mounted to the lower gear 60, and the upper gear 70 is placed over the lower gear 60, such that the gears are preferably concentric. The upper portion 62a of the lower gear ring is received in the space between the shelf 74 and lower ring portion 71b, such that the lower portion 71b rests on top of the lower teeth 66. The upper gear 70 has a larger diameter than the lower gear 60, such that the upper teeth 72 extend beyond the lower teeth 66. The gear 28 of the roller 22 engages the teeth 76, and at least a portion of the roller 22 protrudes through the upper opening 77 in the upper gear 70.

The roller 22 is actuated by rotating the upper gear 70 about the lower gear 60 in a selected direction. As the gear 70 rotates, the teeth 76 rotate the gear 28, spinning the roller 22. The roller spinning direction may be reversed by rotating the gear 70 in an opposite direction.

The upper surface 78 of the central ring is stepped up from the upper surface 72a of the teeth 72. Thus, when the roller plate 10 is assembled, the upper surfaces 78 of the central rings are coplanar with or extend above the upper plate 12, while the gear teeth 72 are below the upper plate 12, as shown in FIG. 1. The openings 16 in the upper plate 12 are sized and configured to receive the upper portion 71a of the ring 71 and allow at least a portion of the roller to protrude above the upper plate 12.

The assemblies 20 are spaced such that one or more or all of the roller assembly upper teeth 72 are intermeshed. Therefore, rotation of one roller assembly ring 71 will cause rotation of a connected ring, actuating multiple rollers.

While the upper gear 70 actuates a roller, the lower gear 60 orients the roller 22 at a select angle relative to a default direction. The lower gear 60 is connected to an orienter, such as a rack gear, which engages the teeth 66 of a roller assembly 20 to orient the roller assembly. The roller plate 10 may also include pinion gears between lower gears 60 to simultaneously orient multiple assemblies.

While the illustrative embodiment shows the actuating mechanism as a cap for the orienting mechanism, the invention is not so limited. For example, alternatively, the orienting mechanism for a roller may be a cap for the actuating mechanism. In addition, various other alternatives are envisioned, and the invention is not limited to the illustrative embodiments described above.

What is claimed is:

1. A housing for a roller in a conveyor, comprising:
a first ring-shaped component for mounting a roller; and
a second ring-shaped component that forms a cap for the first ring-shaped component to sandwich the roller between the first ring-shaped component and the second ring-shaped component, the second ring-shaped component having a central opening, wherein the second ring-shaped component is rotatable about the first ring-shaped component to induce rotation of the roller about a central axis.

2. The housing of claim 1, wherein the second ring-shaped component comprises a plurality of downward facing teeth for engaging a gear on the roller.

3. The housing of claim 1, wherein the first ring-shaped component includes opposing slots for receiving axle ends of the roller.

4. The housing of claim 1, wherein the first ring-shaped component includes an inner shelf about a central opening.

5. The housing of claim 1, wherein the first ring-shaped component includes an upper portion with a central opening and a lower portion that has a smaller central opening than the upper portion to create an inner shelf for supporting ends of the roller.

6. The housing of claim 5, wherein the first ring-shaped component includes peripheral teeth about the lower portion for orienting the housing.

7. The housing of claim 1, wherein the second ring-shaped component is concentric with the first ring-shaped component.

8. The housing of claim 1, wherein the second ring-shaped component comprises a central ring including outer peripheral teeth, an upper portion above the outer peripheral teeth and a lower portion extending below the outer peripheral teeth.

9. The housing of claim 8, wherein the inside of the central ring is stepped to form a shelf.

10. The housing of claim 9, wherein the second ring-shaped component further includes an inner ring of teeth distributed about the inner rim of the central ring and stepped up from the shelf.

11. A housing for a roller in a conveyor, comprising:
a first component for mounting a roller; and
a second component comprising a central ring with peripheral teeth and an inner ring of teeth distributed about an inner rim of the central ring, the inner ring of teeth facing downwards towards the first component, the second component sandwiching the roller between the first component and the second component, wherein the second component is rotatable about the first component to induce rotation of the roller about a central axis.

12. The housing of claim 11, wherein the first component comprises a ring-shaped component having peripheral teeth.

13. The housing of claim 12, wherein the first component includes opposing slots in an upper portion for receiving axle portions of a roller.

14. The housing of claim 11, wherein the second component is concentric with the first component.

15. A housing for a roller in a conveyor, comprising:
a first component for mounting a roller, wherein the first component includes a central ring having opposing slots for receiving axles of the roller in an upper portion and peripheral teeth distributed about a lower portion, wherein the lower portion has a smaller central opening than the upper portion to create an inner shelf in the central ring; and
a second component that forms a cap for the first component to sandwich the roller between the first component and the second component, wherein the second component is rotatable about the first component to induce rotation of the roller about a central axis.

16. The housing of claim 15, wherein the second component comprises a central ring that is concentric with the central ring of the first component.

17. The housing of claim 16, wherein the second component includes peripheral teeth on the central ring and an inner ring of teeth distributed about an inner rim of the central ring, the inner ring of teeth facing downwards towards the first component.

* * * * *